May 11, 1965  A. B. CASTLE  3,183,512
MECHANICAL GRAPHIC RECORDING OMNI-DIRECTIONAL ACCELEROMETER
Filed June 17, 1963  5 Sheets-Sheet 1

INVENTOR
ALBERT B. CASTLE
BY Claude Funkhouser
ATTORNEY

May 11, 1965
A. B. CASTLE
3,183,512
MECHANICAL GRAPHIC RECORDING OMNI-DIRECTIONAL ACCELEROMETER
Filed June 17, 1963
5 Sheets-Sheet 2
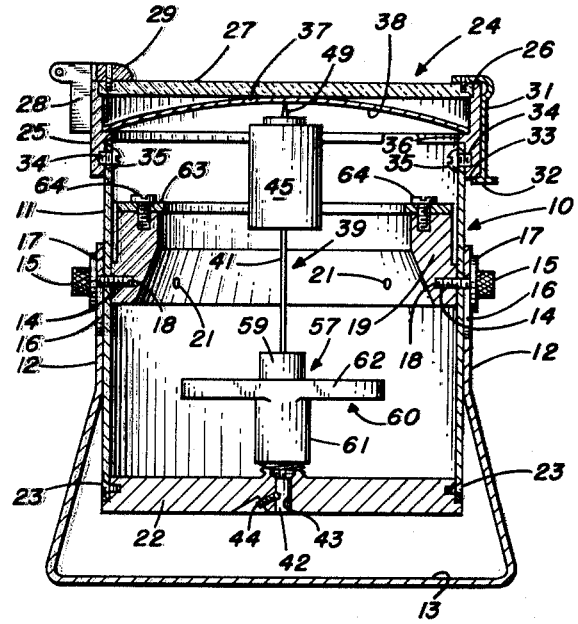
FIG. 3
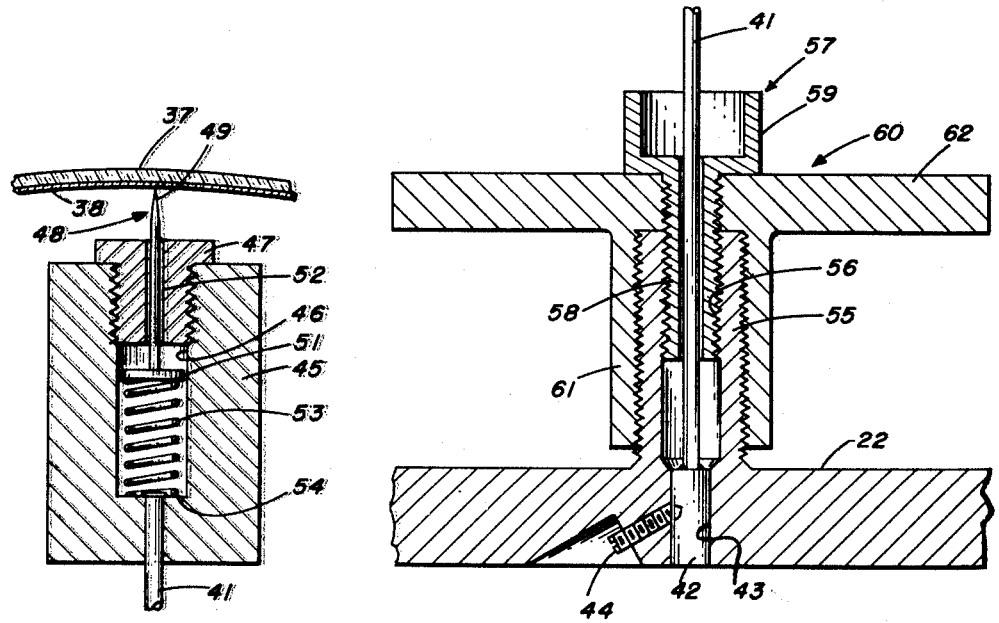
FIG. 4
FIG. 5

May 11, 1965    A. B. CASTLE    3,183,512
MECHANICAL GRAPHIC RECORDING OMNI-DIRECTIONAL ACCELEROMETER
Filed June 17, 1963    5 Sheets-Sheet 3

United States Patent Office 3,183,512
Patented May 11, 1965

3,183,512
MECHANICAL GRAPHIC RECORDING OMNI-DIRECTIONAL ACCELEROMETER
Alfred B. Castle, Washington, D.C., assignor to the United States of America as represented by the Secretary of the Navy
Filed June 17, 1963, Ser. No. 288,566
5 Claims. (Cl. 346—7)
(Granted under Title 35, U.S. Code (1952), sec. 266)

The invention described herein may be manufactured and used by or for the Government of the United States of America for governmental purposes without the payment of any royalties thereon or therefor.

This invention relates to an accelerometer and more particularly to a mechanical graphic recording omni-directional accelerometer.

More specifically, this invention contemplates the provision of a new and improved omni-directional instrument suitable for use on an aircraft for determining the acceleration forces to which the aircraft is subjected upon catapulting and arrestment aboard an aircraft carrier. The instrument is constructed and arranged to make available graphic representations immediately after the flight of an aircraft from a carrier, the acceleration forces experienced by the aircraft when catapulted and arrested. Such information is essential to determine whether the aircraft has experienced the necessary range of accelerations or received accelerations which would be considered detrimental to the aircraft. Heretofore, during test flights, the aircraft normally carried complicated electrical equipment and instruments which yielded more detailed time-acceleration information than does the instant device. However, with the prior type of equipment, the results are only available following lengthy and time consuming operations such, for example, as reduction of taped and photographed time-acceleration data and thus the data is not available while the tests are being conducted, thereby preventing an on the spot check to obtain the desired information.

The present invention provides a mechanical, graphic recording, omni-directional accelerometer which overcomes the disadvantages encountered in prior art devices and which is of minimum size and weight, simple in construction and which obtains and discloses immediate information on the range of peak accelerations experienced by the aircraft during catapulting and arrestment thereof aboard a carrier thereby allowing an on the spot check of the information obtained.

An object of the present invention is to provide a mechanical, graphic recording, omni-directional accelerometer suitable for use with an aircraft during acceleration test.

Another object of the invention is to provide an accelerometer for recording or indicating the maximum forces experienced by an aircraft upon catapulting and arrestment thereof aboard an aircraft carrier.

Still another object of the invention is to provide an accelerometer constructed and arranged to determine whether the aircraft has experienced the necessary range of accelerations or received accelerations which would be considered detrimental to the aircraft immediately after the test operations are completed by on the spot field calibrations.

A further object of the invention is to provide a new and improved acceleration recording device capable of recording all acceleration forces experienced by an aircraft.

A still further object of the invention is to provide a new and improved acceleration device wherein deflection of a mass is recorded on a suitable surface such, for example, as a surface of wax or the like.

Other objects, advantages and novel features of the invention will become apparent from the following detailed description of the invention when considered in conjunction with the accompanying drawings wherein:

FIG. 3 is a central longitudinal sectional view taken substantially on the line 3—3 of FIG. 2;

FIG. 4 is an enlarged fragmentary detail sectional view of the stylus end of the accelerometer;

FIG. 5 is an enlarged fragmentary detail sectional view of the mounting and spring adjusting end of the accelerometer.

Figure 1:
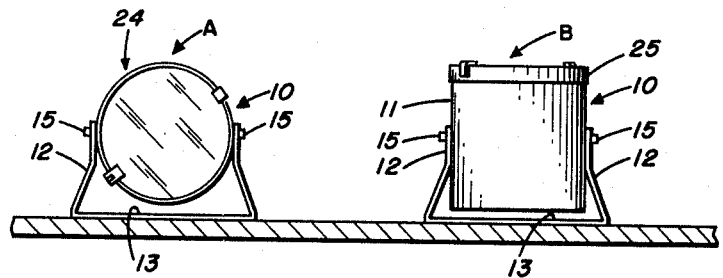
FIG. 1 is a view illustrating the manner in which the device of the present invention may be employed in an aircraft for recording all acceleration forces experienced by the aircraft.
Figure 2:
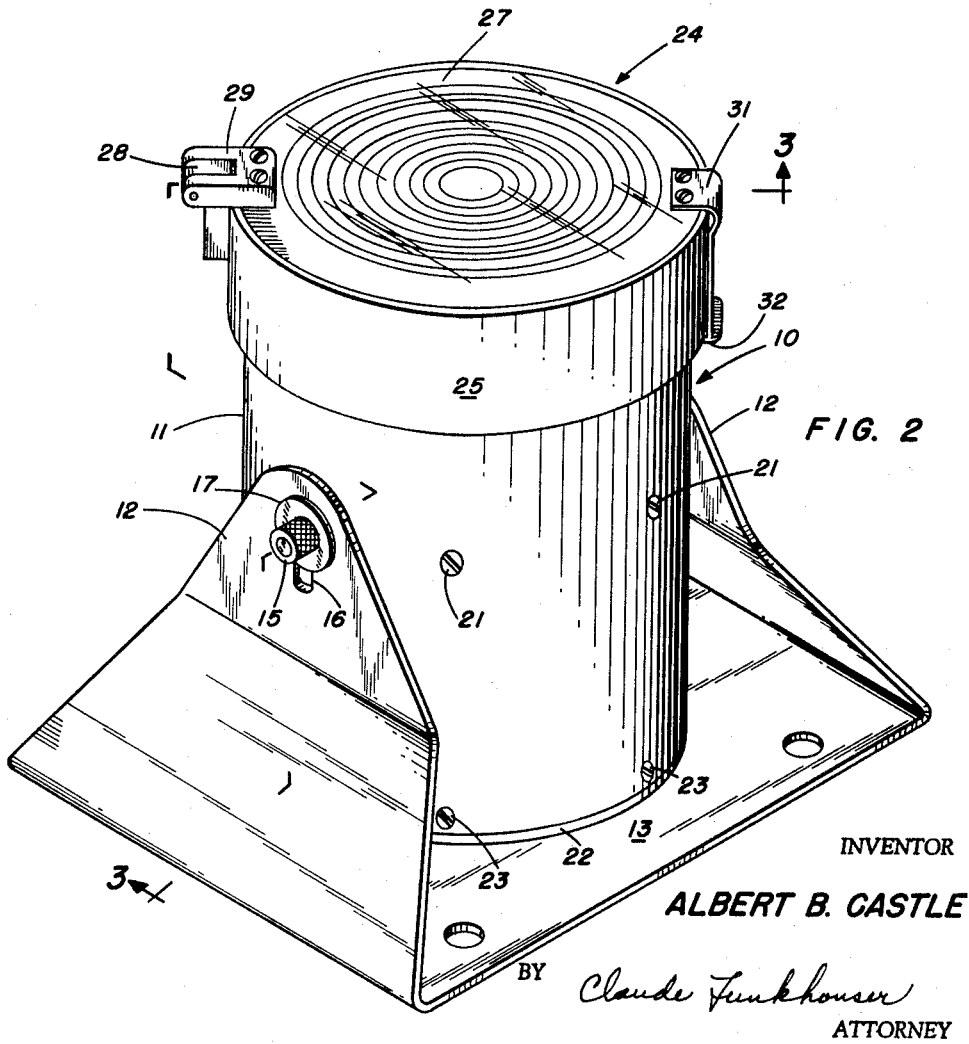
FIG. 2 is a view in perspective of one of the devices of FIG. 1.

Referring now to the drawings, and more particularly to FIGS. 1 and 2 thereof, the numeral 10 indicates generally the accelerometer constructed in accordance with the present invention. In practice, two accelerometer units, A and B, FIG. 1, are mounted on a test aircraft, these units being disposed as close to the center of gravity of the aircraft as possible with the recording planes thereof at a right angle with respect to each other thereby to measure all acceleration forces experienced by the aircraft.

The accelerometer 10 comprises a cylindrical casing 11, pivotally and adjustably mounted on spaced supports or ears 12 carried by a base or mounting member 13, as by pins 14 having knurled heads 15, slots 16 in the ears 12, and washers 17 disposed between the heads 15 and the outer surfaces of the ears 12. As more clearly shown on FIG. 3, the pins 14 are threaded into opening 18 formed in a bumper support 19 disposed within the casing 11 in spaced relationship with the outer edge thereof and secured thereto by screws 21.

The casing 11 is provided at one end with a closure or end wall 22 secured thereto, as by screws or the like 23, the other end of the casing being provided with a dial and watch glass assembly indicated generally by the number 24. The assembly comprises an annular frame 25 having a shoulder or seat 26 formed in the upper end thereof for receiving a pivotally mounted dial 27 composed of plastic material or any other material suitable for the purpose. The dial or cover 27 is pivotally mounted to the casing 11, as by a hinge element 28 carried by the dial 27. It will be noted in FIG. 3 that the dial 24 is seated on the shoulder 26, and is maintained in seated engagement therewith by a spring latch 31 having a latch element 32 in engagement with the annular frame 25, as at 33. The dial 27 carries a plurality of concentrically nested circular scale lines corresponding to the different amplitudes of the angular displacement of the stylus 49 as a function of the acceleration forces to which the apparatus is subjected.

The frame 25 is provided with an annular groove 34 near the lower edge thereof for receiving lock pins 35 carried by the casing for locking the frame to the casing, as best shown in FIG. 3. The frame is further provided with an anular rib or abutment 36 disposed between the seat 26 and the groove 34 upon which is seated the outer edge of a watch glass or crystal 37, the concave surface of which is coated with any pliable material suitable for the purpose such, for example, as wax or the like, and indicated by the numeral 38, FIG. 4.

A cantilever assembly indicated generally by the numeral 39 and comprising a cantilever spring 41 is mounted centrally within the casing 11 and includes an enlarged cylindrical element or mounting member 42 at the lower end thereof; the member 42 being disposed in an opening 43 formed in the wall 22 and secured therein as by a screw 44. The spring 41 extends a substantial distance above the wall 22 and carries a cantilevered mass 45 at the upper end thereof. As best shown on FIG. 4, the mass is provided with a centrally disposed bore 46 closed by a plug or stylus bushing 47 threaded into the bore 46.

A stylus indicated generally by the numeral 48 is carried by the mass 45, and includes a scriber portion 49 disposed at one end and a flange portion or disc 51 disposed at the other end thereof, the scriber 49 being slidably supported in a bore 52 formed in plug 47 and the disc 51 being slidably suported in bore 46 formed in the mass 45. The scriber portion 49 of the stylus 48 is urged and maintained in engagement with the wax 38 on the concave surface of the watch glass or crystal 37 by a spring 53 disposed in bore 46 and having one end in engagement with disc 51 of the stylus and the other end thereof in engagement with the wall 54 defining the bottom of the bore 46, as best shown on FIG. 4.

In FIG. 5 it will be noted that the wall 22 has formed therewith a sleeve or support 55 extending into the casing 11 and provided with a threaded bore 56.

Means for varying the effective length of the spring 41 as indicated generally by the numeral 57, is adjustably carried by the sleeve 55 and includes threaded shank or tubular member 58 in threaded engagement with bore 56 and an anulus or cup-shaped member 59 at the outermost end thereof. By the aforesaid arrangement it will be apparent that the effective length of the cantilever spring 41 may be altered, if desired, by threading the shank 58 into and/or out of the bore 56.

A locking device indicated generally by the numeral 60 and including an internally threaded sleeve 61 is disposed in threaded engagement with members 55 and a handle or actuating element 62 in threaded engagement with the shank 58 provides means whereby the spring length adjuster may be locked in its adjusted positions, as by engaging the actuating element with the cup-shaped member, as shown on FIGS. 3 and 5.

It will be further noted in FIG. 3 that an anular bumper 63 carried by and secured to the support 19, as by screws or the like 64, is arranged in such a manner as to limit the movement of the mass 45, the bumper being composed of any material suitable for the purpose.

From the foregoing it will be apparent that the instrument of the present invention is essentially a cantilever supported rod like member of spring steel with a concentrated mass at its free end. The deflection of the mass is recorded by a stylus engaging a suitable surface such, for example, as wax or the like.

The deflection of the aforesaid cantilever is given by the following equation:

$$Y = \frac{Fl^3}{3EI}$$

where Y is the deflection, F is the force or loading of the beam at its free end, l is the length of the beam, I is the moment of inetria of the beam and E the modulus of elasticity of the beam material. Since the force is equal to the mass located at the free end times the acceleration of the mass the deflection Y is directly proportional to the acceleration. Under constant acceleration (gravity) a field calibration can be made at the desired acceleration levels by increasing the mass by known factors of two, three, four, etc.

Since this instrument records displacement of the mass in a plane, two units with their recording planes at a right angle with respect to each other will measure all acceleration forces experienced by the aircraft when catapulted and arrested.

The instrument has been calibrated statically by the addition of masses to the cantilever spring, and tested dynamically in a cetnrifuge. The repeatability of the reading at an acceleration of 7G was ±0.1G. Its natural frequency was determined as approximately 11 cycles per second. Although the instrument is not critically damped, the stylus bearing on the glass does provide a damping effort on the mass.

In test operations two devices or instruments are used on the aircraft, mainly to measure catapult and arrestment accelerations, the instruments being mounted on the aircraft so that its recording plane coincided with the vertical and forward components of flight and as close to the center of gravity as possible. The records obtained from several test flights on the aircraft are shown in FIGS. 6 through 10, wherein the arrow in these figures indicates the line of flight of the aircraft. The accelerations obtained from the aforesaid records are tabulated in the following Table A along with the acceleration data obtained by conventional accelerometers also installed at the center of gravity of the aircraft. The latter data obtained are designated as "Peak Long Accelerators at C.G."

TABLE A.—DECELERATION IN G'S

Figure 6:
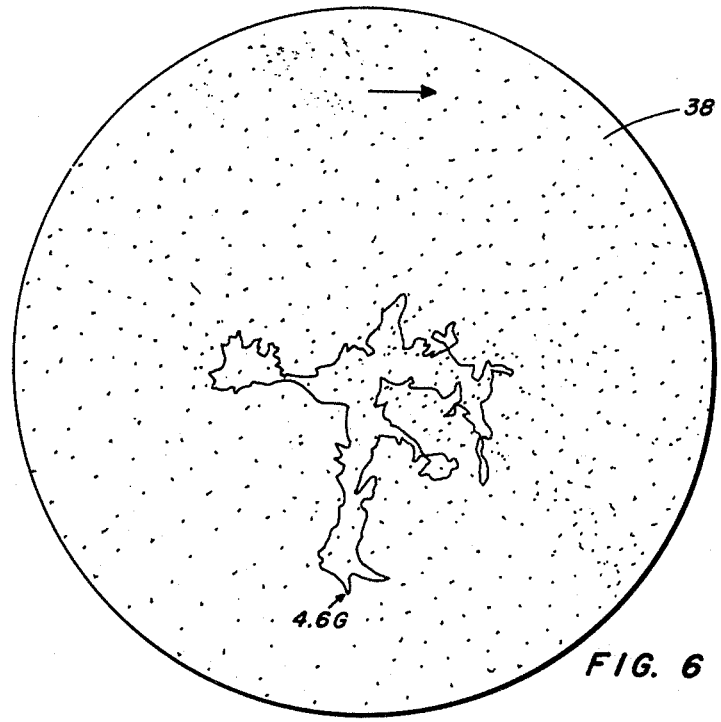
FIGS. 6 through 10 illustrate graphic recordings produced by the accelerometer of the present invention.
Figure 7:
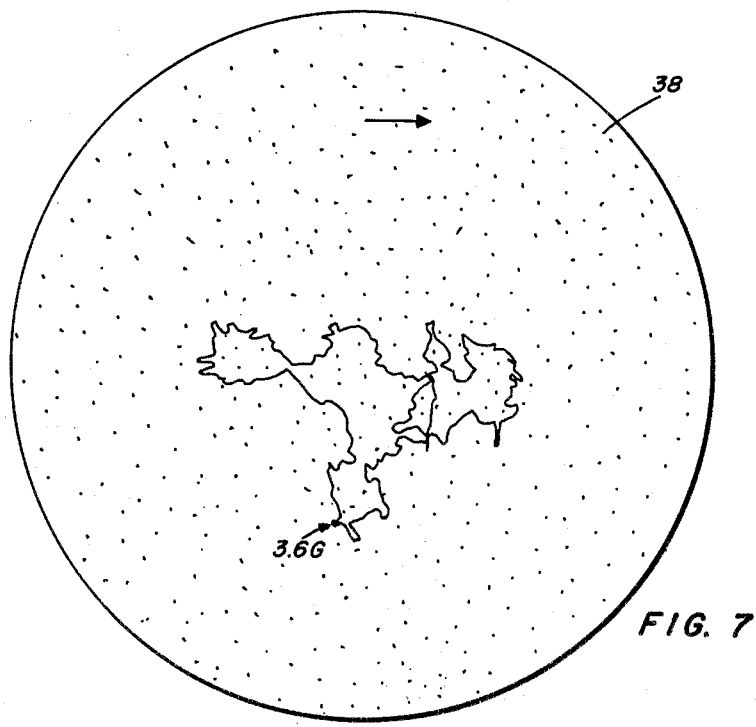
Figure 8:
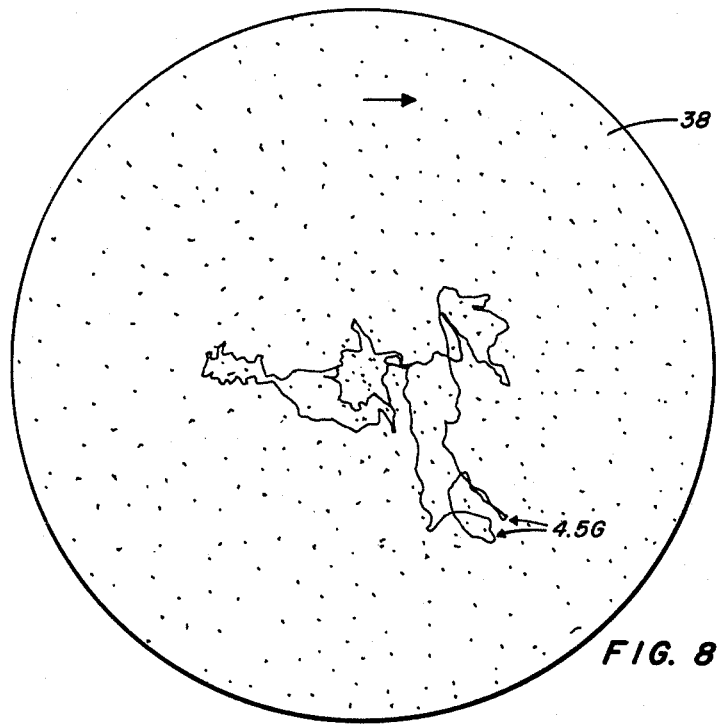
Figure 9:
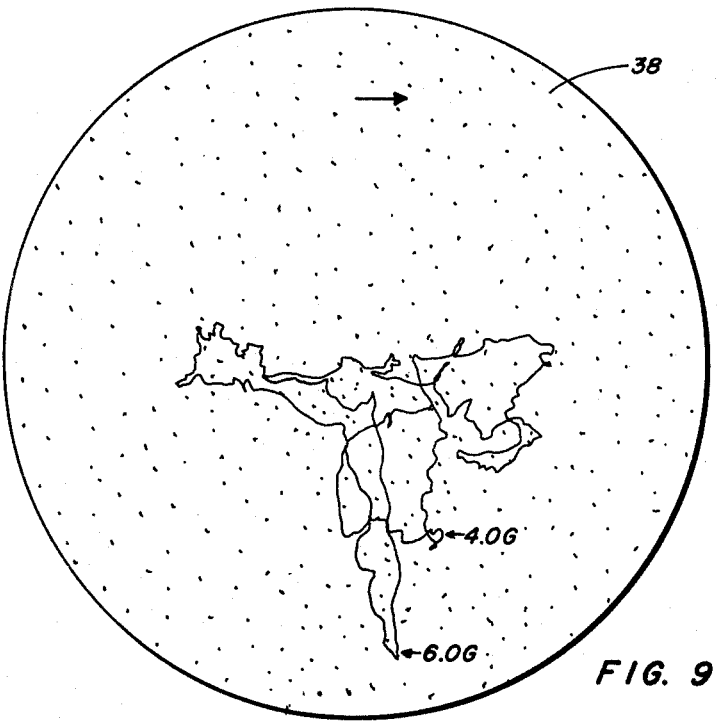
Figure 10:
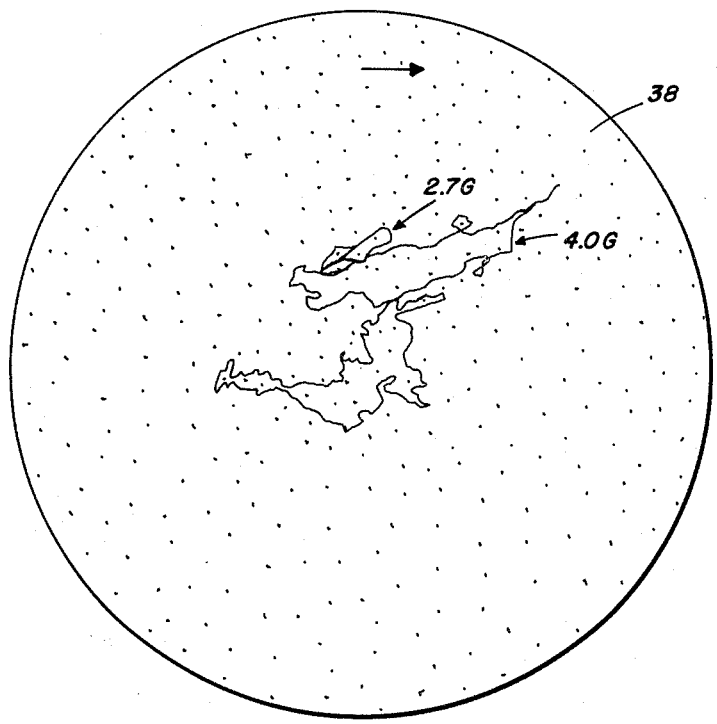

| Arrest | Vertical electronic accelerometer | Vertical plane mechanical accelerometer (sustained) |
|---|---|---|
| 1 | No record | 4.6—Figure 6. |
| 2 | 3.28 | 3.6—Figure 7. |
| 3 | No record | 4.5—Figure 8. |
| 4 | do | 4.0–6.0—Figure 9. |
| 5 | 2.89 | 4.0 and 2.7—Figure 10. |

It will be noted that the records of the device of the present invention indicate the actual direction of the peak acceleration which does not always appear along the vertical axis. The accelerations encountered in catapulting appear on the same record indicating the appropriate direction.

It will be noted that since the device of the present invention records accelerations in a plane along the longitudinal axis of the aircraft, and that since the aircraft is subjected to simultaneous vertical and fore and aft acceleration, the resultant graph appears to display personal flying characteristics of the pilot. For example, such as indicated in FIG. 7 where the pilot of this flight test executed three catapultings and arrestments producing substantially identical acceleration records. FIG. 8 was a repeat of the same maneuver by another pilot in which the record discloses that there was an unusually severe landing. This maneuver was not recorded by the electronic instrumentation aboard the aircraft since the pilot failed to energize the instrumentation.

From the foregoing, it will be apparent that a new and improved mechanical graphic recording omni-directional accelerometer has been devised which is small in size, light in weight and which produces a permanent record easily recovered from the aircraft and in addition thereto operates without any attention of the pilot and is readily calibrated in the field.

Obviously many modifications and variations of the present invention are possible in the light of the above teachings. It is, therefore, to be understood that within the scope of the appended claims the invention may be practiced otherwise than as specifically described.

What is claimed is:
1. A recording accelerometer comprising:
   a cylindrical casing;
   an annular frame secured to one end of said casing;
   a closure plate secured to the other end of the casing;
   a cantilever spring disposed within the casing and having one end secured to said closure plate;
   a mass mounted on the free end of said cantilever spring and displaceable in response to acceleration forces;
   a disc disposed within and supported by said frame;
   a recording surface on said disc;
   a stylus carried by said mass and constantly in engagement with said recording surface for producing thereon records according to the displacement of the mass;
   a spring disposed within the mass in engagement with the stylus for maintaining the stylus in engagement with the recording surface;

shoulder means on the frame in engagement with the disc for supporting the disc within said frame;

a dial pivotally mounted on the frame in engagement with the disc for maintaining the disc in engagement with said shoulder means;

means carried by said dial in locking engagement with the frame for releasably locking the dial to the frame;

adjustable means mounted in said closure plate and movable along the cantilever spring for controlling the effective length thereof;

means mounted on the closure plate and engageable with said adjustable means for locking said adjustable means in adjusted positions; and means disposed within the casing for limiting the movement of the mass therein.

2. A recording accelerometer according to claim 1 wherein said adjustable means includes:

a threaded shank in threaded engagement with the closure plate and provided with a bore for receiving said cantilever spring; and a cup-shaped member at one end thereof and having an annular wall in spaced relation with respect to the cantilever spring.

3. A recording accelerometer according to claim 1 wherein said locking means includes:

a sleeve in threaded engagement with the closure plate and an actuating member engageable with said adjustable means.

4. A recording accelerometer comprising:

a cylindrical casing;

a cantilever spring disposed within the casing and having one end fixed to said casing;

a mass mounted on the free end of said cantilever spring;

a mounting ferrule carried by said casing and having a threaded bore;

an adjuster in threaded engagement with said bore and movable along the cantilever spring for controlling the effective length thereof;

means threaded on said mounting ferrule and engageable with said adjuster for locking the adjuster in an adjusted position;

a recording surface carried by said casing; and stylus means carried by said mass in engagement with said recording surface for producing thereon records of the displacement of the mass when the accelerometer is subjected to acceleration forces.

5. A recording accelerometer comprising:

a casing;

a cantilever spring disposed within and having one end fixed to the casing and free end thereof supporting a mass;

a mounting ferrule carried by said casing and having a threaded bore therein;

an adjuster in threaded engagement with said bore and movable along the cantilever spring for controlling the effective length thereof;

a sleeve threaded on said mounting ferrule;

locking means carried by said sleeve engageable with said adjuster for locking the adjuster in an adjusted position;

a convex watch type crystal carried by said casing;

a wax recording surface disposed on the inner face of the convex watch type crystal; and a spring urged stylus carried by said mass in engagement with said wax recording surface for producing thereon records upon displacement of the mass by acceleration forces.

References Cited by the Examiner
UNITED STATES PATENTS

| | | | |
|---|---|---|---|
| 2,601,440 | 6/52 | Kerrigan | 116—114.29 |
| 2,903,320 | 9/59 | Changy | 346—7 |
| 3,016,612 | 1/62 | Lynott | 346—139 |
| 3,020,874 | 2/62 | Bruce et al. | 116—114.29 |

LEO SMILOW, *Primary Examiner.*